US011118630B2

(12) United States Patent
Lawrence et al.

(10) Patent No.: US 11,118,630 B2
(45) Date of Patent: Sep. 14, 2021

(54) ADAPTER FOR A VALVE SYSTEM

(71) Applicant: Caterpillar Inc., Deerfield, IN (US)

(72) Inventors: Rodney A. Lawrence, Frankfort, IN (US); Brandyn A. Stack, Lafayette, IN (US); William Jenkins, Flora, IN (US)

(73) Assignee: Caterpillar Inc., Peoria, IL (US)

( * ) Notice: Subject to any disclaimer, the term of this patent is extended or adjusted under 35 U.S.C. 154(b) by 211 days.

(21) Appl. No.: 16/271,341

(22) Filed: Feb. 8, 2019

(65) Prior Publication Data

US 2020/0256395 A1 Aug. 13, 2020

(51) Int. Cl.
*F16K 31/00* (2006.01)
*F16D 1/10* (2006.01)
*F16K 1/22* (2006.01)
*F02M 26/70* (2016.01)

(52) U.S. Cl.
CPC .............. *F16D 1/101* (2013.01); *F16K 1/221* (2013.01); *F16K 31/00* (2013.01); *F02M 26/70* (2016.02); *F16D 2001/102* (2013.01)

(58) Field of Classification Search
CPC ... F16D 1/101; F16D 2001/102; F02M 26/70; F16K 31/00; F16K 1/221
USPC ................... 251/291–293, 305–308
See application file for complete search history.

(56) References Cited

U.S. PATENT DOCUMENTS

| 3,904,173 | A | * | 9/1975 | Naylor | F16K 1/2265 |
| | | | | | 251/306 |
| 3,997,142 | A | * | 12/1976 | Broadway | F16K 1/2263 |
| | | | | | 251/307 |
| 4,024,890 | A | * | 5/1977 | Yasuoka | F16K 1/221 |
| | | | | | 137/556.3 |
| 4,094,231 | A | | 6/1978 | Carr | |
| 4,113,063 | A | | 9/1978 | Troy | |
| 4,213,480 | A | | 7/1980 | Orum et al. | |
| 4,272,057 | A | * | 6/1981 | Haugland | F16K 5/0626 |
| | | | | | 137/315.35 |
| 4,616,673 | A | * | 10/1986 | Bondar | F16K 31/60 |
| | | | | | 137/315.15 |
| 5,887,608 | A | | 3/1999 | Bordelon et al. | |
| 6,874,757 | B2 | * | 4/2005 | Hallett | F16K 5/0647 |
| | | | | | 251/292 |
| 7,325,782 | B2 | * | 2/2008 | Gebler | F16K 31/003 |
| | | | | | 251/129.11 |
| 8,113,230 | B2 | * | 2/2012 | Vuojamo | F16K 5/0647 |
| | | | | | 137/385 |

(Continued)

FOREIGN PATENT DOCUMENTS

DE   19845684   4/2000

*Primary Examiner* — John Bastianelli
(74) *Attorney, Agent, or Firm* — Bookoff McAndrews

(57) ABSTRACT

A valve system may include a valve having a housing with a bore and a valve member positioned within the bore. The valve member may include a valve shaft with a recess. The valve system may also include an actuator having an actuator shaft with an end portion. An adapter may couple the valve shaft and the actuator shaft. The adapter may include a body having a shape corresponding to a shape of the recess of the valve shaft for fitting the adapter within the recess and an aperture extending into the body. The aperture may have a shape corresponding to a shape of the end portion of the actuator shaft for press fitting the adapter onto the actuator shaft. The adapter may fit within the recess and press fit coupled to the actuator shaft.

20 Claims, 4 Drawing Sheets

(56) References Cited

U.S. PATENT DOCUMENTS

| | | | |
|---|---|---|---|
| 8,132,784 B2* | 3/2012 | Ferrero | F16K 31/041 |
| | | | 251/214 |
| 8,465,001 B2* | 6/2013 | Witkowski | F16K 5/0442 |
| | | | 251/89 |
| 2003/0136935 A1* | 7/2003 | Lorenz | F02D 9/10 |
| | | | 251/305 |
| 2005/0260052 A1 | 11/2005 | Lovchik et al. | |
| 2007/0108402 A1* | 5/2007 | Davis | F16K 41/16 |
| | | | 251/293 |
| 2009/0114867 A1 | 5/2009 | Miller et al. | |
| 2013/0206238 A1* | 8/2013 | Gent | F16K 1/224 |
| | | | 137/1 |
| 2014/0252260 A1 | 9/2014 | Woods | |
| 2019/0024815 A1 | 1/2019 | Lou | |

* cited by examiner

ADAPTER FOR A VALVE SYSTEM

TECHNICAL FIELD

The present disclosure relates generally to valves in internal combustion engines, and more particularly, to an adapter for such valves.

BACKGROUND

Valves, such as butterfly valves, may be used in different systems of an internal combustion engine. Such valves may include a valve plate connected to a valve shaft. An actuator shaft of an actuator may be fitted into a corresponding recess of the valve shaft to drive and control the position of the valve plate. For example, the actuator may rotate the valve shaft such that the valve plate rotates to open and close the valve. Many conventional actuator shafts include two parallel flats connected by rounded ends in what is known as a "double-d" configuration that engage with the corresponding recess of the valve shaft. This interface between the actuator shaft and the corresponding recess of the valve shaft may have a limited surface area. As a result, the interface may create high contact pressure and the surfaces that transmit torque from the actuator shaft to the valve shaft may wear. This may prevent the valve plate from being rotated to a desired position, such that the valve plate does not adequately open and/or close. For example, inadequate closure may negatively impact performance of the internal combustion engine.

U.S. Patent Publication No. 2009/0114867 ("the '867 publication") discloses a rotary valve actuation lever apparatus having interchangeable shaft adaptor inserts. The '867 publication discloses an actuator coupled to a rotary valve via a lever in order to operate a flow control member of the rotary valve. The actuator lever apparatus includes a cylindrical opening with a splined inner surface to receive a valve shaft. As such, the actuator lever-to-valve shaft connection of the '867 publication is female-to-male. The '867 publication further discloses that the valve shaft may include a square or double-d shape. A shaft adapter connects the square valve shaft to the cylindrical splined actuator lever apparatus. The shaft adapter includes a cylindrically-shaped splined outer surface and an opening. The shaft adapter is inserted into the opening of the actuator lever apparatus such that the splined outer surface of the shaft adapter mates and/or engages with the splined inner surface of the actuator lever apparatus. The opening of the shaft adapter is configured to receive the valve shaft. For example, the opening of the shaft adapter may be square to receive a square valve shaft. Thus, rotation of the lever rotates the valve shaft and the flow control member of the rotary valve. However, the splined adapter of the '867 publication may provide for a loose connection which may allow movement between the actuator lever apparatus, splined adapter, and/or the valve shaft. The movement may eventually cause wear to the actuator lever apparatus, splined adapter, and/or the valve shaft.

The adapter of the present disclosure may solve one or more of the problems set forth above and/or other problems in the art. The scope of the current disclosure, however, is not defined by the attached claims, and not by the ability to solve any specific problem.

SUMMARY

In one aspect, a valve system for an internal combustion engine may include a valve. The valve may include a housing with a bore through which fluid may flow. The valve may also include a valve member positioned within the bore for selectively restricting flow through the bore. The valve member may include a valve shaft rotatably received in a shaft opening of the housing. The valve shaft may include a recess. The valve system may further include an actuator coupled to the housing of the valve. The actuator may include an actuator shaft with an end portion. The valve system may also include an adapter coupling the valve shaft and the actuator shaft. The adapter may include a body having a shape corresponding to a shape of the recess of the valve shaft for fitting the adapter within the recess. The adapter may further include an aperture extending into the body. The aperture may have a shape corresponding to a shape of the end portion of the actuator shaft for press fitting the adapter onto the actuator shaft. The adapter may be fit within the recess and press fit coupled to the actuator shaft so that the actuator can selectively move the valve member between an open position and a closed position.

In another aspect, an adapter for a valve system of an internal combustion engine may include a body having a generally hexagonal shape corresponding to a generally hexagonal recess of a valve shaft of the valve system for fitting the adapter within the recess. The adapter may also include an aperture extending into the body, the aperture having a generally double-d shape corresponding to a generally double-d shape of an end portion of an actuator shaft for press fitting the adapter onto the actuator shaft prior to fitting the adapter within the recess.

In yet another aspect, a valve system for an internal combustion engine may include a valve. The valve may include a housing with a bore through which fluid may flow. The valve may also include a valve member positioned within the bore for selectively restricting flow through the bore. The valve member may include a valve shaft rotatably mounted in a shaft opening of the housing. The valve shaft may include a recess having a generally hexagonal shape. The valve system may further include an actuator mounted on the housing of the valve, the actuator including an actuator shaft with an end portion having a generally double-d shape. The valve system may also include an adapter coupling the valve shaft and the actuator shaft. The adapter may include a body having a generally hexagonal shape corresponding to the generally hexagonal shape of the recess of the valve shaft for fitting the adapter within the recess. The adapter may also include an aperture extending into the body, the aperture having a generally double-d shape corresponding to the generally double-d shape of the end portion of the actuator shaft for press fitting the adapter onto the actuator. The adapter may be fit within the recess and press fit coupled to the actuator shaft so that the actuator can selectively move the valve member between an open position and a closed position.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Specifically, FIG. 3A illustrates a perspective view, FIG. 3B illustrates a side view, FIG. 3C illustrates a top view, and FIG. 3D illustrates a bottom view of the exemplary adapter.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, relative terms, such as, for example, "about," "substantially," "generally," and "approximately" are used to indicate a possible variation of ±10% in a stated value.

Figure 1:
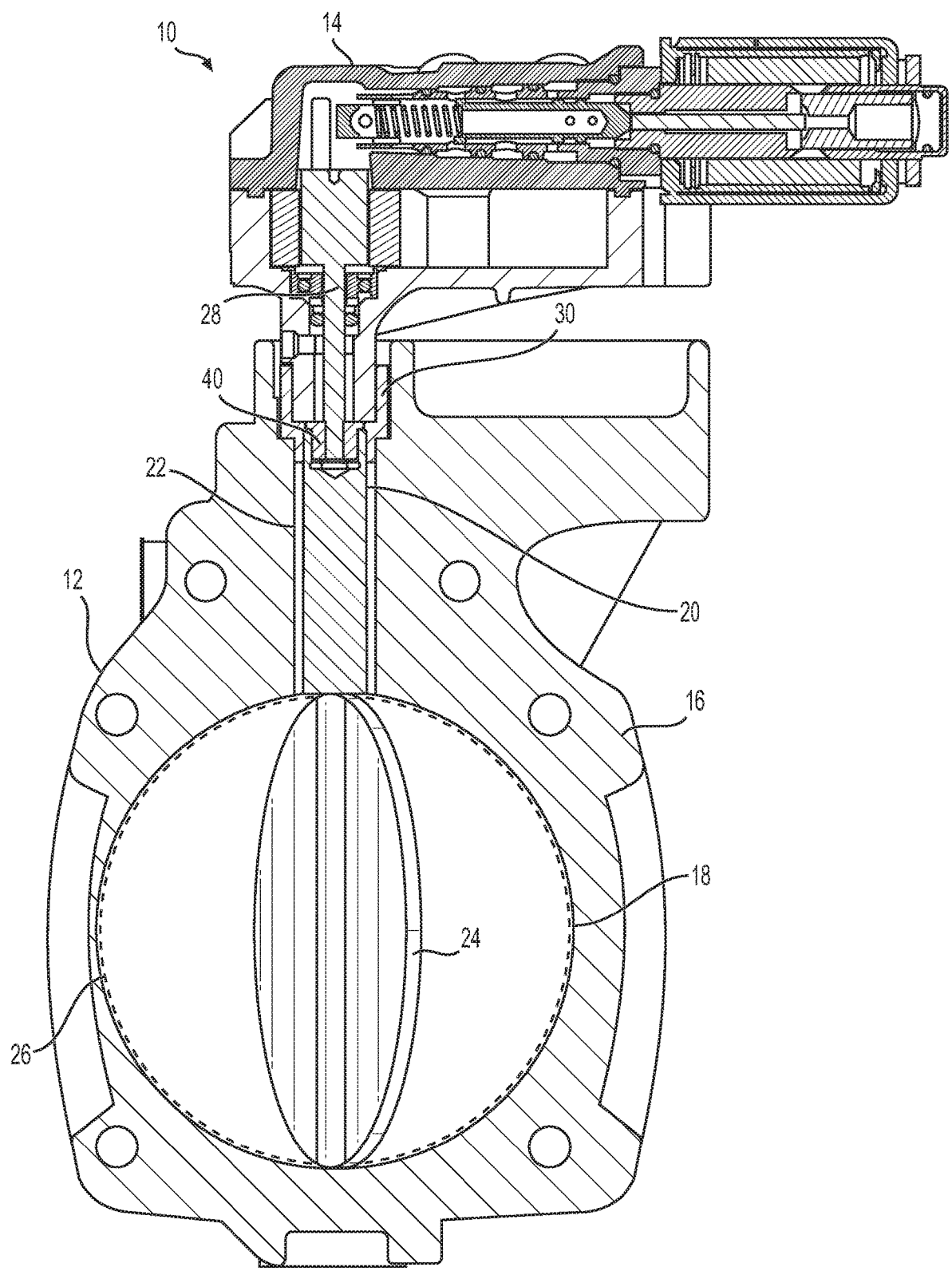
FIG. 1 illustrates a front cutaway view of an exemplary valve system, according to aspects of the disclosure.

FIG. 1 illustrates a front cutaway view of a valve system 10, according to aspects of the disclosure. Valve system 10 may include a valve 12 and an actuator 14. A control system (not shown) may be used to control the operation of valve 12. In one embodiment, valve 12 may be configured as a butterfly valve and may be positioned within an exhaust manifold of an internal combustion engine. For example, valve system 10 may be an exhaust restriction valve (ERV) system of an exhaust gas recirculation (EGR) system for controlling the amount of exhaust gas that is diverted to the EGR system. While the exemplary embodiment of the present disclosure is made with reference to a valve system 10 for an EGR system, it is understood that the teachings of this disclosure may be employed in other types of valves or valve systems, such as a valve system for a turbocharger, or any other valve system for regulating the flow of fluid.

Valve 12 may include a valve housing 16 or body with a bore 18 through which a fluid, such as gas, may flow. Bore 18 may include a generally cylindrical shape. However, bore 18 may be any shape or size as necessary for allowing fluid to flow therethrough. A stem or valve shaft 20 may be rotatably mounted within a corresponding opening 22 of the valve housing 16. A valve member, such as valve plate 24, may be mounted on the valve shaft 20. Valve plate 24 may be generally circular shaped and may be dimensioned to fit within bore 18. The assembly of the valve shaft 20 and the valve plate 24 may be configured so as to be moveable or rotatable within bore 18 between a first open position (shown in FIG. 1) and a second closed position (depicted by phantom lines at 26) for selectively restricting fluid flow through bore 18. At the first open position, valve plate 24 may be aligned generally parallel to the direction of flow of fluid through the bore 18 so that the flow through the bore 18 is substantially unrestricted. At the second closed position, the valve plate 24 may be positioned generally perpendicular to the direction of flow of fluid through the bore 18 so that the flow is substantially blocked or restricted. It is understood that the valve member may be any suitable valve member and may be any suitable size or shape as necessary for selectively restricting fluid flow through bore 18.

Actuator 14 may be mounted on a top side of the valve housing 16. In one embodiment, actuator 14 may be a rotary hydraulic actuator (RHA). However, actuator 14 may be any type of actuator including electrical, gear or lever driven, pneumatic, or the like. Actuator 14 may include an actuator shaft 28 extending through the opening 22 of valve housing 16. Actuator shaft 28 may be coupled to a top end of valve shaft 20. As such, actuator 14 may control rotation of valve shaft 20 and thus position of valve plate 24 within bore 18. For example, actuator 14, through actuator shaft 28, may selectively rotate valve shaft 20 such that valve plate 24 moves between the first open position and the second closed position for selectively restricting fluid flow through bore 18. Valve system 10 may further include an adapter 40 for coupling actuator shaft 28 to valve shaft 20, as further detailed below.

Figure 2:
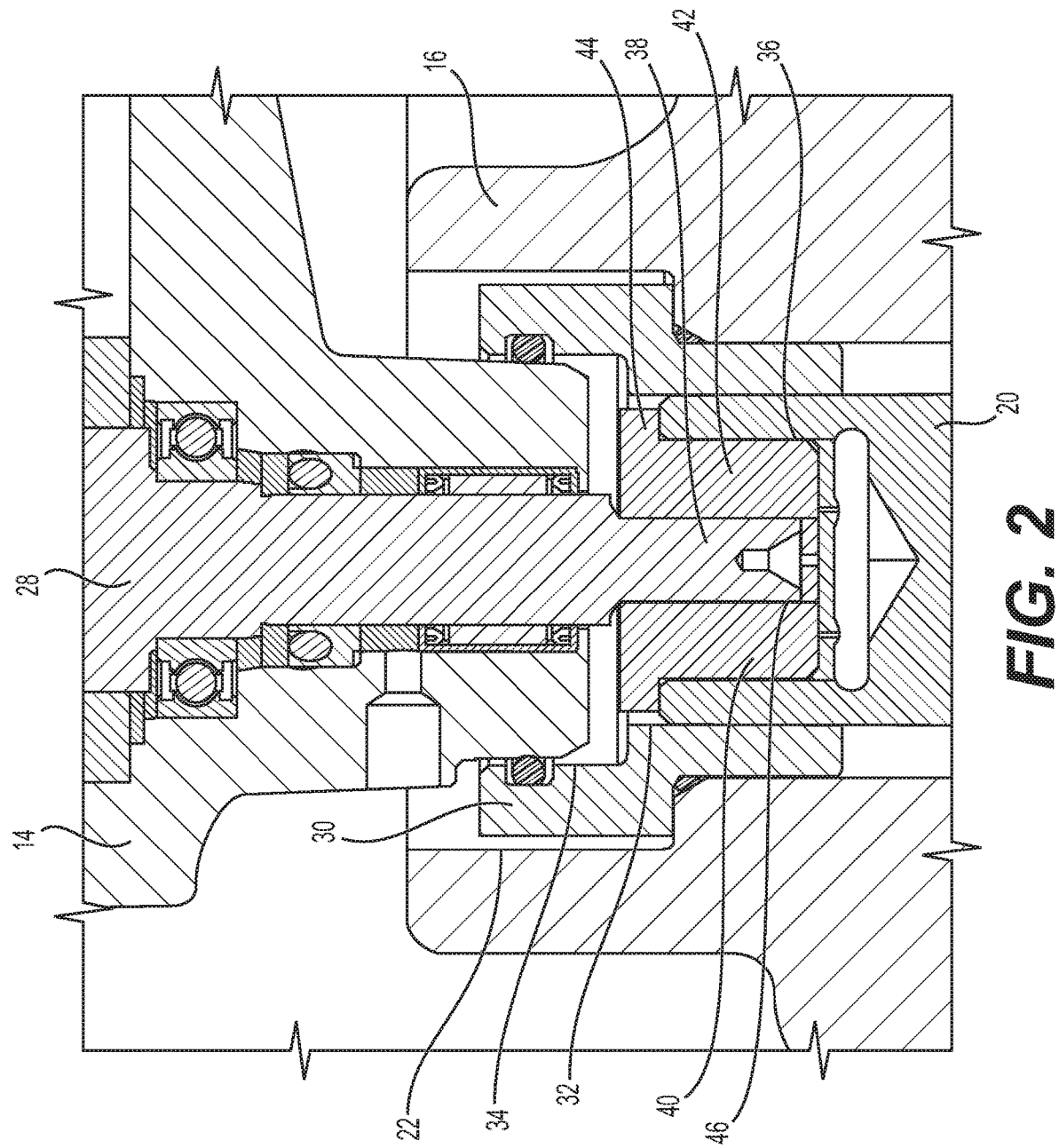
FIG. 2 illustrates an enlarged cutaway view of an exemplary adapter mounted in the valve system of FIG. 1.

FIG. 2 illustrates an enlarged cutaway view of the exemplary adapter 40 mounted in valve system 10. As shown in FIG. 2, valve system 10 may include a bushing 30 mounted in the opening 22 of valve housing 16. Bushing 30 may be press fit or threaded into opening 22. Bushing 30 may include a first opening 32 for receiving the top end of valve shaft 20 for rotating within bushing 30. Bushing 30 may further include a second opening 34 for receiving a portion of actuator 14 for mounting the actuator 14 to valve housing 16. In the exemplary embodiment, bushing 30 may include a generally cylindrical shape and the first and second openings 32, 34 may also include a generally cylindrical shape. However, bushing 30 and first and second openings 32, 34 may be any size or shape as necessary so as to receive a corresponding actuator 14 and a corresponding valve shaft 20 of any size or shape.

As further shown in FIG. 2, valve shaft 20 may include a recess 36 for receiving an end portion 38 of actuator shaft 28. In the exemplary embodiment, recess 36 may include a generally hexagonal shape. Further, end portion 38 of actuator shaft 28 may include a generally double-d shape for being inserted into a corresponding aperture 46 of adapter 40, as further detailed below. As used herein, a "double-d" shape may include a perimeter formed from diametrically opposed arc segments of a circle, the circle being truncated on opposite sides thereof by a pair of chords equidistant from and parallel to a diameter which perpendicularly bisects the arc segments.

Adapter 40 may include a body 42 having a shape corresponding to the shape of recess 36 of valve shaft 20. As such, adapter 40 may be configured to be inserted or fit into recess 36 of valve shaft 20. Adapter 40 may further include a flange 44 located at a top end of body 42. Flange 44 may extend over a top end of valve shaft 20 when adapter 40 is inserted into recess 36. Additionally, adapter 40 may include a central aperture 46 extending through the body 42 of adapter 40. Aperture 46 may include a shape corresponding to the shape of end portion 38 of actuator shaft 28. Aperture 46 may further include a size that is slightly smaller than a size of end portion 38 of actuator shaft 28, such that adapter 40 may be press fit onto end portion 38 of actuator shaft 28 prior to being inserted into recess 36 of valve shaft 20. As used herein, "press fit" may include a fastening between two parts which is achieved by friction after the parts are pushed together such that the parts do not move relative to each other. For example, end portion 38 of actuator 28 may be press fit into aperture 46 of adapter 40, such that end portion 38 does not move relative to adapter 40. Thus, adapter 40 may assist in coupling actuator shaft 28 to valve shaft 20 and may provide additional contact surfaces between actuator shaft 28 and valve shaft 20.

Figure 3B:
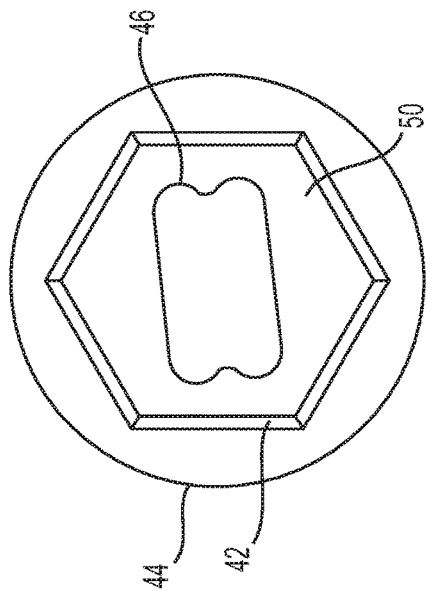
FIGS. 3A-3D illustrate various views of the exemplary adapter isolated from the valve system of FIGS. 1 and 2.
Figure 3D:
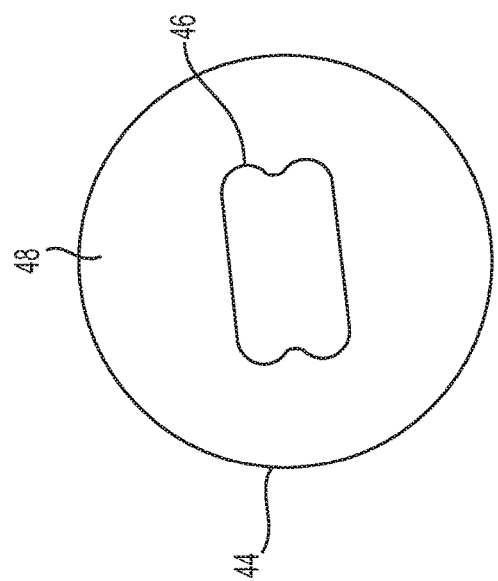
Figure 3A:
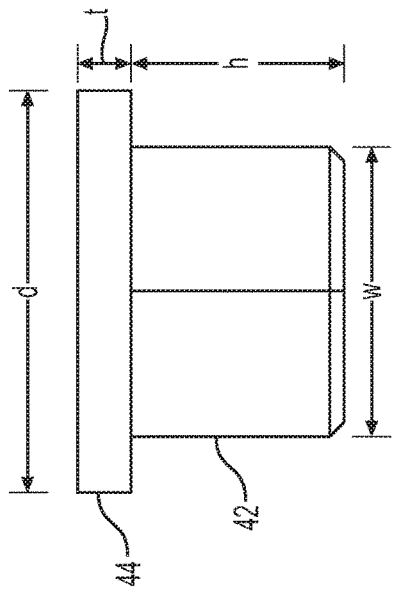
Figure 3C:
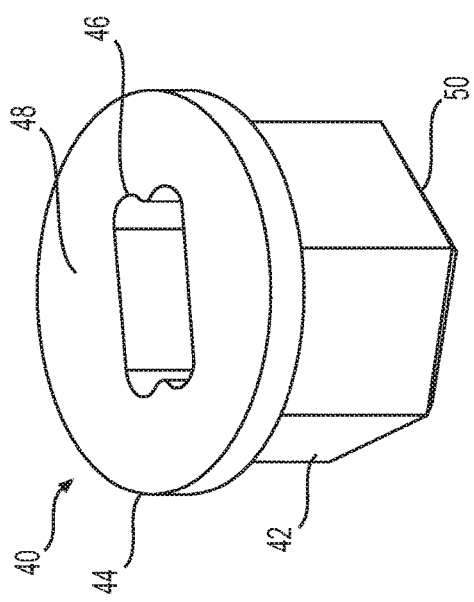

FIGS. 3A-3D illustrate various views of the exemplary adapter 40 isolated from valve system 10. Specifically, FIG. 3A illustrates a perspective view, FIG. 3B illustrates a side view, FIG. 3C illustrates a top view, and FIG. 3D illustrates a bottom view of the exemplary adapter 40. As shown in FIGS. 3A-3D, body 42 of adapter 40 may include a generally hexagonal shape. Body 42 may include a height, h, and width, w, corresponding to a height and width of recess 36 of valve shaft 20. For example, the height, h, of body 42 may be between 5 millimeters and 50 millimeters and the width, w, of body 42 may be between 5 millimeters and 50 millimeters. Flange 44 may include a generally circular shape. Flange 44 may include a thickness, t, such that flange 44 extends over a top surface of valve shaft 20 when adapter 40 is inserted into recess 36. Flange 44 may further include a diameter, d, greater than a diameter of recess 36 such that flange 44 extends substantially over the top surface of valve shaft 20. As such, the thickness, t, of flange 44 may be between 2 millimeters and 10 millimeters and the diameter, d, of flange 44 may be between 10 millimeters and 80 millimeters. Further, adapter 40 may be made from iron, steel, metal alloys, or the like.

As further shown in FIGS. 3A-3D, aperture 46 of adapter 40 may extend through an entirety of body 42 from a top surface 48 of flange 44 through a bottom surface 50 of body 42. However, aperture 46 may alternatively extend through only a portion of body 42 for receiving end portion 38 of actuator shaft 28. Aperture 46 may include a generally double-d shape corresponding to the generally double-d shape of the end portion 38 of actuator shaft 28. In the exemplary embodiment, aperture 46 may include a height corresponding to the total height, h, and thickness, t, of body 42 and flange 44. As such, the height of aperture 46 may be between 7 millimeters and 60 millimeters.

Figure 4:
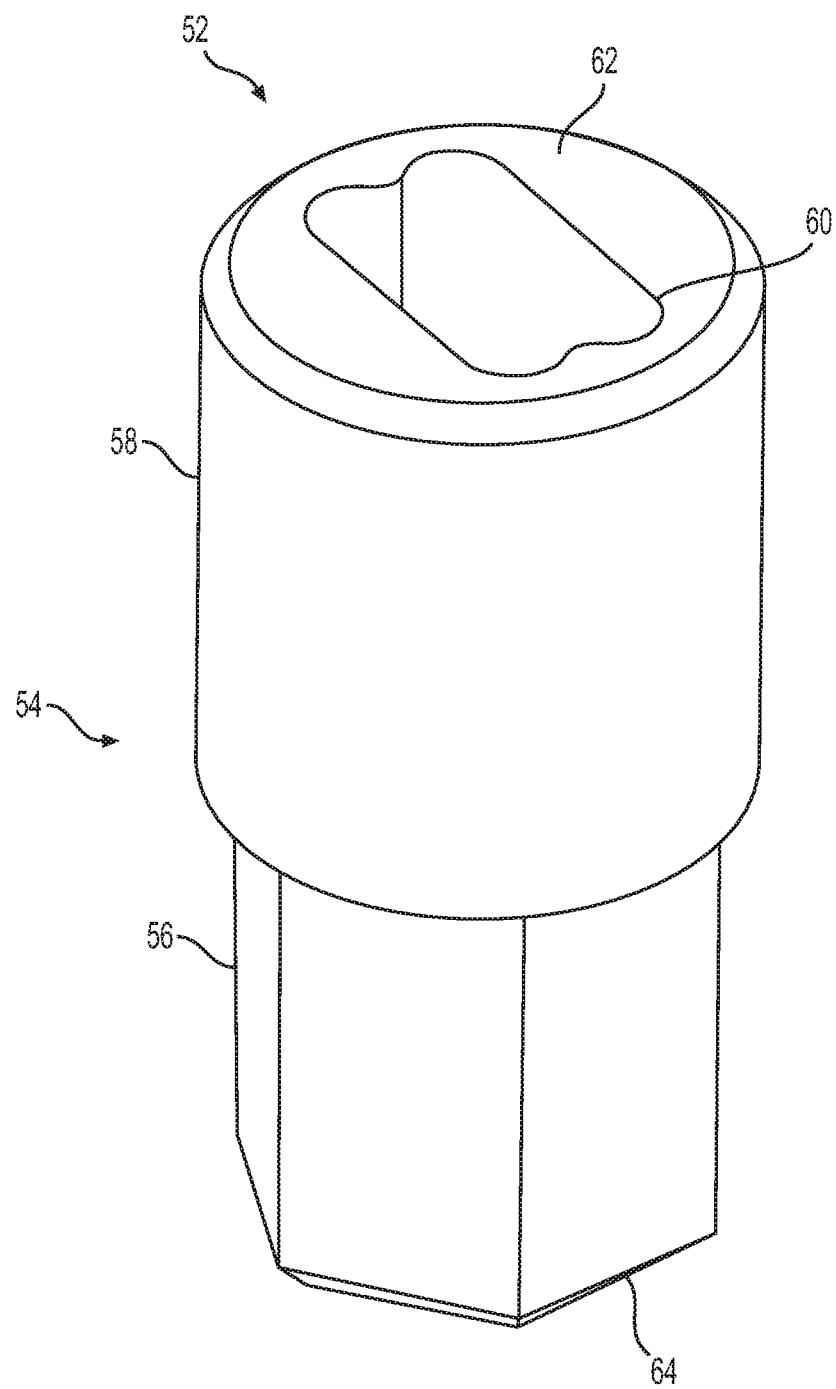
FIG. 4 illustrates a perspective view of another embodiment of the adapter isolated from the valve system of FIG. 1.

FIG. 4 illustrates a perspective view of an adapter 52 according to another embodiment, isolated from the valve system 10. As shown in FIG. 4, adapter 52 may include a body 54 having a lower portion 56 and an upper portion 58. Lower portion 56 may include a generally hexagonal shape, similar to body 42 of adapter 40. Lower portion 56 may include a height and width corresponding to a height and width of recess 36 of valve shaft 20. However, the height and width of lower portion 56 of adapter 52 may be different than the height, h, and width, w, of body 42 of adapter 40. For example, the height of lower portion 56 may be between 5 millimeters and 50 millimeters and the width of lower portion 56 may be between 5 millimeters and 50 millimeters.

Upper portion 58 of body 54 may include a generally cylindrical shape and may include a larger diameter than lower portion 56 such that upper portion 58 is wider than lower portion 56. Similar to flange 44 of adapter 40, upper portion 56 may include a thickness and a diameter such that upper portion 56 extends over a top surface of valve shaft 20 when adapter 52 is inserted into recess 36 of valve shaft 20. However, the thickness and diameter of upper portion 58 of adapter 52 may be different than the thickness, t, and diameter, d, of flange 44 of adapter 40. For example, the thickness of upper portion 58 may be between 5 millimeters and 50 millimeters and the diameter of upper portion 58 may be between 5 millimeters and 50 millimeters. Further, adapter 52 may be made from iron, steel, metal alloys, or the like.

As further shown in FIG. 4, adapter 52 may further include an aperture 60 extending through the body 54. Aperture 60 may extend from a top surface 62 of upper portion 58 through a bottom surface 64 of lower portion 56. However, aperture 60 may alternatively extend through only upper portion 58 such that only upper portion 58 receives the corresponding end portion 38 of actuator shaft 28. Aperture 60 of adapter 52 may include a generally double-d shape corresponding to the generally double-d shape of the end portion 38 of actuator shaft 28, similar to adapter 40. Aperture 60 may include a height corresponding to the total height of lower portion 56 and upper portion 58. As such, the height of aperture 60 may be between 10 millimeters and 100 millimeters. It is understood that upper and lower portions 58, 56 of body 54 and aperture 60 may be any size or shape as necessary, such as circular, square-shaped, rectangular, hexagonal, or the like. Lower portion 56 of body 54 and aperture 60 may each further include splines corresponding to splines of recess 36 of valve shaft 20 and splines of actuator shaft 28, respectively.

INDUSTRIAL APPLICABILITY

The disclosed aspects of adapters 40, 52 may be used in any valve system 10 having an actuator shaft 28 inserted into a recess 36 of a valve shaft 20. Referring to FIGS. 1 and 2, the present disclosure relates to adapters 40, 52 having a generally hexagonal body 42 or lower portion 56 for fitting the adapters 40, 52 into a corresponding generally hexagonal recess 36 of valve shaft 20. The adapters 40, 52 may further include an aperture 46, 60 with a generally double-d shape for receiving a corresponding double-d shaped actuator shaft 28. As such, the adapters 40, 52 may be press fit onto the actuator shaft 28 prior to being inserted into the recess 36 of valve shaft 20. The press fit between the actuator shaft 28 and adapters 40, 52 may prevent actuator shaft 28 from rotating or otherwise moving within apertures 46, 60 of adapters 40, 52. Further, the hexagonal shape of adapters 40, 52 may provide an interface between the actuator shaft 28 and the valve shaft 20 with a large surface area, and thus a large contact area. Thus, the adapters 40, 52 may be used to prevent wear between the actuator shaft 28 and recess 36 of valve shaft 20. Further, the adapters 40, 52 may help facilitate rotation of valve plate 24 for adequately opening and closing valve 12.

It will be apparent to those skilled in the art that various modifications and variations can be made to the disclosed system without departing from the scope of the disclosure. For example, while adapter 40, 52 is described above as having flange 44 or upper portion 58, it is understood that the flange 44 or upper portion 58 could be omitted so that the adapter 40, 52 includes only a body 42, 54. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A valve system for an internal combustion engine, comprising:
   a valve including:
      a housing with a bore through which fluid may flow;
      a valve member positioned within the bore for selectively restricting flow through the bore, the valve member including a valve shaft rotatably mounted in a shaft opening of the housing, wherein the valve shaft includes a recess having a generally hexagonal shape;
   an actuator mounted on the housing of the valve, the actuator including an actuator shaft with an end portion having a generally double-d shape, wherein the generally double-d shape includes a perimeter formed from diametrically opposed arc segments of a circle, the circle being truncated on opposite sides thereof by a pair of chords equidistant from and parallel to a diameter which perpendicularly bisects the arc segments; and an adapter coupling the valve shaft and the actuator shaft, the adapter including:

a body having a generally hexagonal shape corresponding to the generally hexagonal shape of the recess of the valve shaft for fitting the adapter within the recess; and an aperture extending into the body, the aperture having a generally double-d shape corresponding to the generally double-d shape of the end portion of the actuator shaft for press fitting the adapter onto the actuator shaft, wherein the adapter is fit within the recess and press fit coupled to the actuator shaft so that the actuator can selectively move the valve member between an open position and a closed position.

2. The valve system of claim 1, wherein the adapter includes a flange located at an end of the adapter.

3. The valve system of claim 2, wherein the flange includes a generally circular shape.

4. The valve system of claim 1, wherein the adapter is made from one of iron, steel, or a metal alloy.

5. The valve system of claim 1, wherein a height of the adapter is between 5 millimeters and 100 millimeters, and wherein a width of the adapter is between 5 millimeters and 80 millimeters.

6. The valve system of claim 1, further including a bushing mounted in the opening of the housing, the bushing including a first opening at a first end and a second opening at a second end opposite the first end, wherein a portion of the actuator is received by the second opening of the bushing and the valve shaft is received in the first opening of the bushing.

7. The valve system of 6, wherein the second opening of the bushing is larger than the first opening of the bushing.

8. A valve system for an internal combustion engine, comprising:

a valve including:
    a housing with a bore through which fluid may flow;
    a bushing mounted in the housing, the bushing including a first opening at a first end and a second opening at a second end opposite the first end;
    a valve member positioned within the bore for selectively restricting flow through the bore, the valve member including a valve shaft rotatably received in the first opening of the bushing, wherein the valve shaft includes a recess;

an actuator, wherein a portion of the actuator is received in the second opening of the bushing such that the actuator is coupled to the housing of the valve, the actuator including an actuator shaft with an end portion; and an adapter coupling the valve shaft and the actuator shaft, the adapter including:

a body having a first shape corresponding to a first shape of the recess of the valve shaft for fitting the adapter within the recess; and an aperture extending into the body, the aperture having a second shape corresponding to a second shape of the end portion of the actuator shaft for press fitting the adapter onto the actuator shaft, wherein the second shape is different than the first shape and includes more contact surfaces than the first shape, wherein the adapter is fit within the recess and press fit coupled to the actuator shaft so that the actuator can selectively move the valve member between an open position and a closed position.

9. The valve system of claim 8, wherein the recess of the valve shaft includes a generally hexagonal shape.

10. The valve system of claim 9, wherein the end portion of the actuator shaft includes a generally double-d shape.

11. The valve system of claim 10, wherein the body of the adapter includes a generally hexagonal shape corresponding to the generally hexagonal shape of the recess of the valve shaft.

12. The valve system of claim 11, wherein the aperture of the adapter includes a generally double-d shape corresponding to the generally double-d shape of the actuator shaft.

13. The valve system of claim 12, wherein the adapter includes a flange located a top end of the body.

14. The valve system of claim 8, wherein the second opening of the bushing is larger than the first opening of the bushing.

15. The valve system of claim 13, wherein the flange includes a generally circular shape.

16. The valve system of claim 8, wherein the adapter is made from one of iron, steel, or a metal alloy.

17. The valve system of claim 8, wherein a height of the adapter is between 5 millimeters and 100 millimeters, and wherein a width of the adapter is between 5 millimeters and 80 millimeters.

18. The valve system of claim 17, wherein a height of the aperture corresponds to the height of the adapter.

19. The valve system of claim 12, wherein the generally double-d shape includes a perimeter formed from diametrically opposed arc segments of a circle, the circle being truncated on opposite sides thereof by a pair of chords equidistant from and parallel to a diameter which perpendicularly bisects the arc segments.

20. The valve system of claim 8, wherein the valve is a butterfly valve and the valve member is a valve plate.

* * * * *